(12) United States Patent
Miura

(10) Patent No.: US 12,015,745 B2
(45) Date of Patent: Jun. 18, 2024

(54) IMAGE PROCESSING APPARATUS CAPABLE OF SHORTENING A WAITING TIME IN EXECUTING OF COOPERATIVE PROCESSING IN COOPERATION WITH A SERVER, COOPERATIVE PROCESSING EXECUTION METHOD, AND COOPERATIVE PROCESSING EXECUTION PROGRAM

(71) Applicant: KONICA MINOLTA, INC., Tokyo (JP)

(72) Inventor: Megumi Miura, Takatsuki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/970,692

(22) Filed: Oct. 21, 2022

(65) Prior Publication Data
US 2023/0142155 A1 May 11, 2023

(30) Foreign Application Priority Data
Nov. 5, 2021 (JP) .................................. 2021-181385

(51) Int. Cl.
*H04N 1/00* (2006.01)
*H04N 1/32* (2006.01)

(52) U.S. Cl.
CPC ..... *H04N 1/00344* (2013.01); *H04N 1/00037* (2013.01); *H04N 1/00244* (2013.01); *H04N 1/00411* (2013.01); *H04N 1/32667* (2013.01); *H04N 2201/0094* (2013.01)

(58) Field of Classification Search
None
See application file for complete search history.

(56) References Cited

U.S. PATENT DOCUMENTS

| 8,947,699 | B2 | 2/2015 | Ito | |
|---|---|---|---|---|
| 11,412,103 | B2 * | 8/2022 | Miyamoto | ........... H04N 1/2038 |
| 2012/0036570 | A1 * | 2/2012 | Wada | ...................... H04L 69/40 726/11 |
| 2013/0019160 | A1 | 1/2013 | Bando | |
| 2017/0024168 | A1 * | 1/2017 | Tamura | ............. H04N 1/00477 |

(Continued)

FOREIGN PATENT DOCUMENTS

| EP | 3187997 A1 | 7/2017 |
|---|---|---|
| JP | 2011119939 A | 6/2011 |

OTHER PUBLICATIONS

European Search Report issued in European Patent Application No. 2220400.0-1224, dated Mar. 17, 2023 (9 pages).

*Primary Examiner* — Haris Sabah
(74) *Attorney, Agent, or Firm* — BUCHANAN INGERSOLL & ROONEY PC

(57) ABSTRACT

An image processing apparatus includes: a first hardware processor that sets cooperative processing including first processing and second processing that cooperate with each other in a server that provides a service that determines the cooperative processing; a second hardware processor that receives a command to execute the first processing; a third hardware processor that generates alternative processing in place of the first processing in a case where it is detected that the command cannot be received after the cooperative processing has been set; and a fourth hardware processor that executes the alternative processing.

14 Claims, 11 Drawing Sheets

(56) References Cited

U.S. PATENT DOCUMENTS

2017/0322759 A1 11/2017 Tokuchi
2018/0349071 A1* 12/2018 Nakamura ............ G06F 3/1292
2020/0382661 A1* 12/2020 Ito ............................ H04N 1/38

* cited by examiner

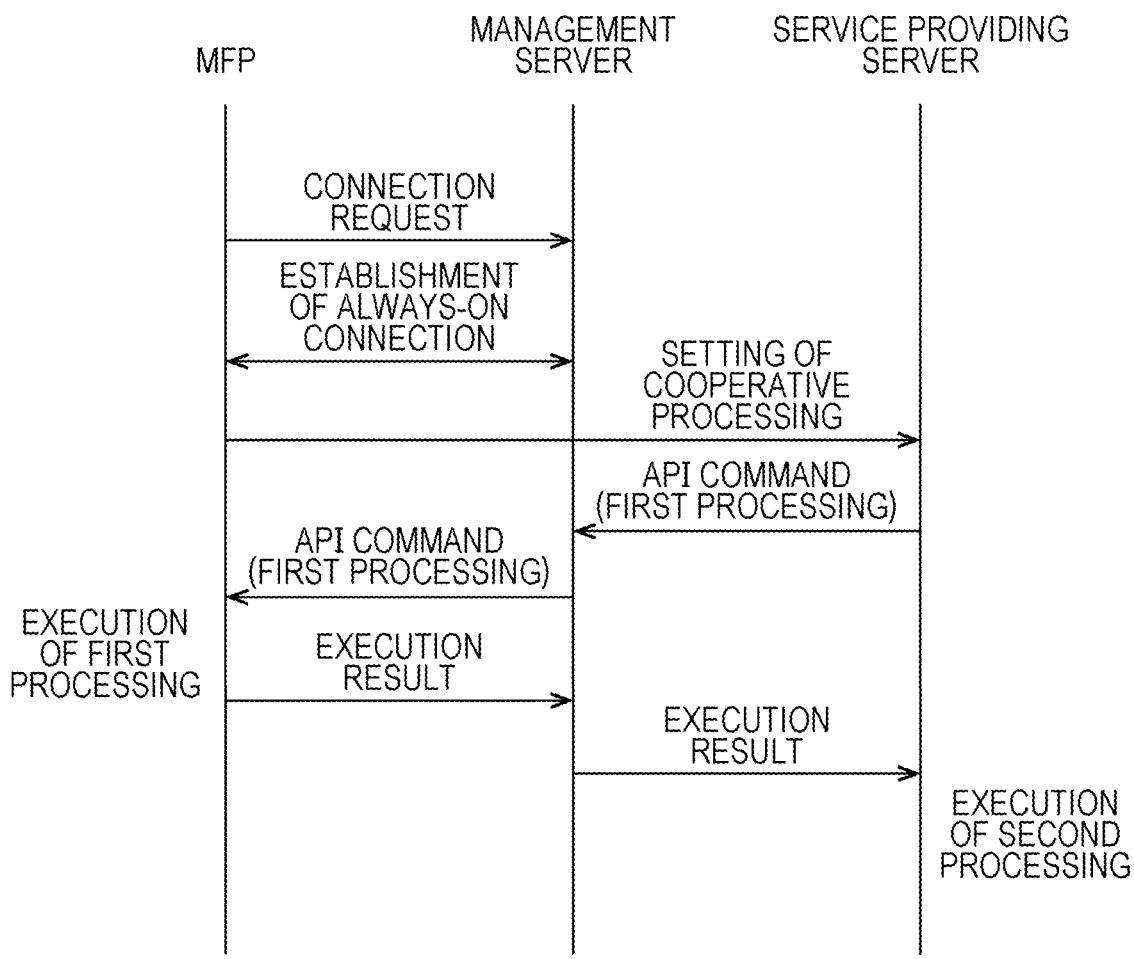

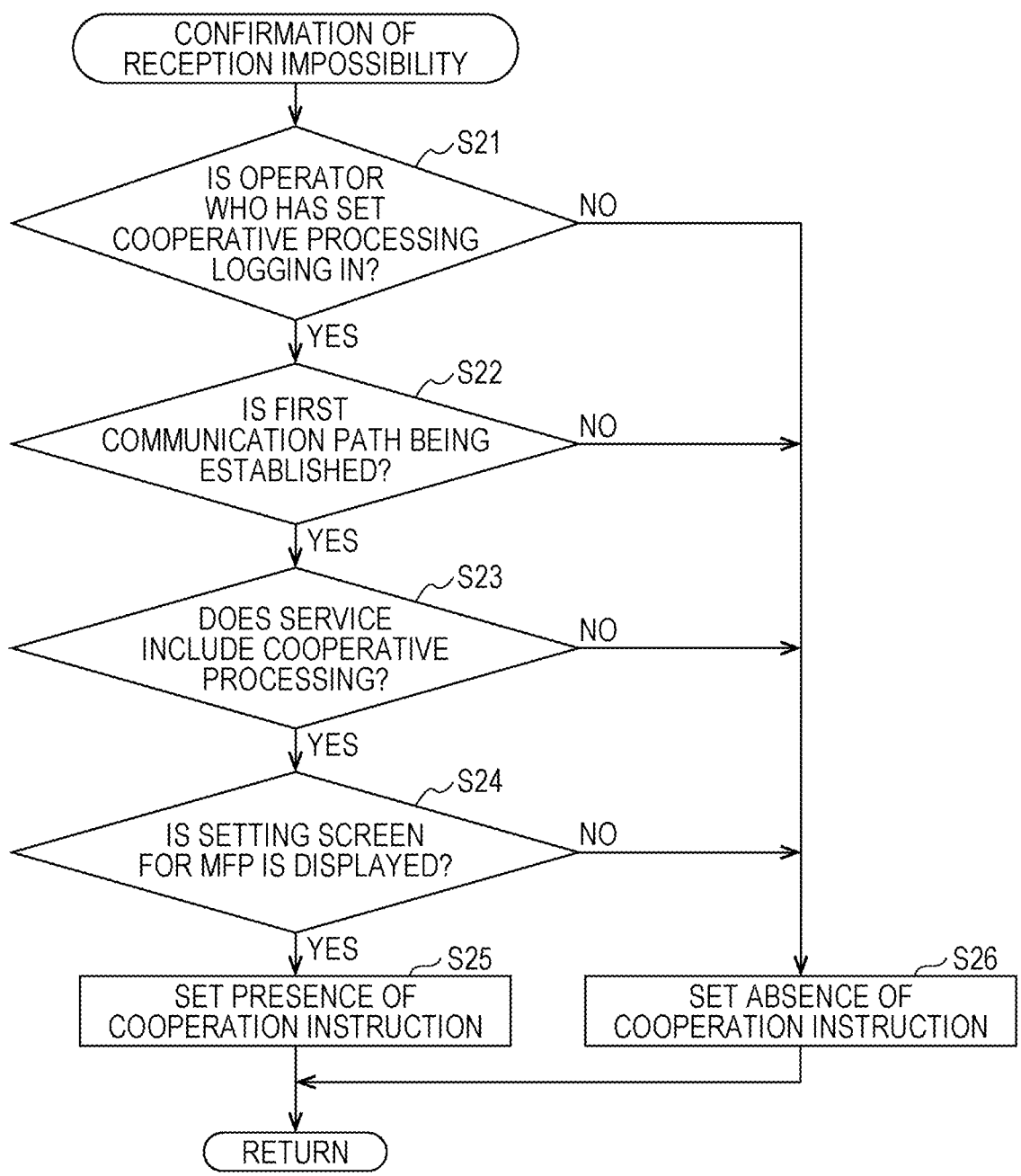

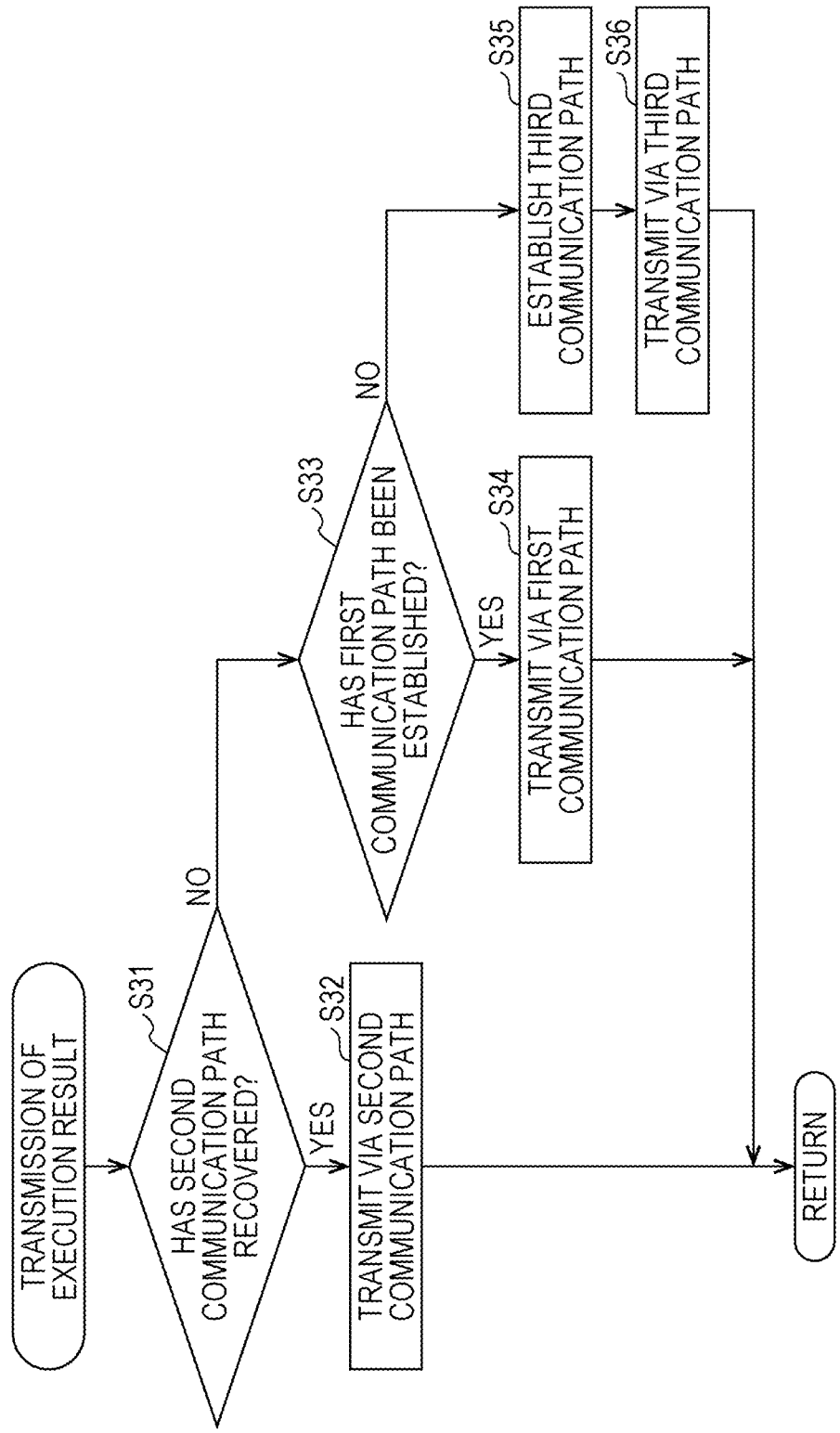

IMAGE PROCESSING APPARATUS CAPABLE OF SHORTENING A WAITING TIME IN EXECUTING OF COOPERATIVE PROCESSING IN COOPERATION WITH A SERVER, COOPERATIVE PROCESSING EXECUTION METHOD, AND COOPERATIVE PROCESSING EXECUTION PROGRAM

The entire disclosure of Japanese patent Application No. 2021-181385, filed on Nov. 5, 2021, is incorporated herein by reference in its entirety.

BACKGROUND

Technological Field

The present invention relates to an image processing apparatus, a cooperative processing execution method, and a cooperative processing execution program, and more particularly, to an image processing apparatus capable of executing cooperative processing in cooperation with a server, a cooperative processing execution method executed by the image processing apparatus, and a cooperative processing execution program causing a computer that controls the image processing apparatus to execute the cooperative processing execution method.

Description of the Related Art

In recent years, a technique that controls a multi function peripheral (hereinafter referred to as "MFP") in cooperation with a server has been known. For example, JP 2011-119939 A describes an image processing apparatus capable of executing at least one image processing function, the image processing apparatus including: a hypertext transfer protocol (HTTP) communication unit that performs communication by HTTP; a requesting unit that requests HTML data of an operation screen from a web server via the HTTP communication unit; and a display controlling unit that receives the HTML data of the operation screen transmitted by the web server in response to the request by the requesting unit, renders the HTML data of the operation screen, and displays the HTML data on an operation unit, in which when the display controlling unit fails to receive the HTML data of the operation screen due to a communication error, the display controlling unit displays an alternative operation screen for performing an operation related to the at least one image processing function on the operation unit.

In the image processing apparatus described in JP 2011-119939 A, in a case where communication with the server is not possible, an alternative operation screen for performing an operation related to the image processing function is displayed on the operation unit, and thus an MFP can be caused to execute processing even in a state in which the MFP cannot communicate with the server.

Meanwhile, there is a case where a service provided by a service providing server connected to the Internet is used to cause the service providing server and the MFP to cooperate with each other and execute a series of cooperative processing including processing executed by the MFP and processing executed by the service providing server. In this case, there are problems that in a state in which the MFP cannot communicate with the server, the cooperative processing cannot be executed and a user has to wait until the MFP and the server can communicate with each other. In particular, in a case where the server controls the cooperative processing, the MFP cannot receive an instruction to execute processing that the MFP is in charge of, and thus the cooperative processing cannot be executed.

SUMMARY

The present invention has been made to solve the above-described problems, and an object of the present invention is to provide an image processing apparatus capable of shortening a waiting time of a user in execution of processing in cooperation with a server.

Another object of the present invention is to provide a cooperative processing execution method capable of shortening a waiting time of a user in execution of processing in cooperation with a server.

Still another object of the present invention is to provide a cooperative processing execution program capable of shortening a waiting time of a user in execution of processing in cooperation with a server.

To achieve at least one of the abovementioned objects, according to an aspect of the present invention, an image processing apparatus reflecting one aspect of the present invention comprises: a first hardware processor that sets cooperative processing including first processing and second processing that cooperate with each other in a server that provides a service that determines the cooperative processing; a second hardware processor that receives a command to execute the first processing; a third hardware processor that generates alternative processing in place of the first processing in a case where it is detected that the command cannot be received after the cooperative processing has been set; and a fourth hardware processor that executes the alternative processing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 3 is a diagram illustrating an outline of a flow of cooperative processing;

FIG. 4 is a diagram illustrating an example of a message transmitted from a management server to the MFP;

FIG. 11 is a flowchart illustrating an example of a flow of reception impossibility confirming processing; and FIG. 12 is a flowchart illustrating an example of a flow of execution result transmitting processing.

DETAILED DESCRIPTION OF EMBODIMENTS

Figure 1:
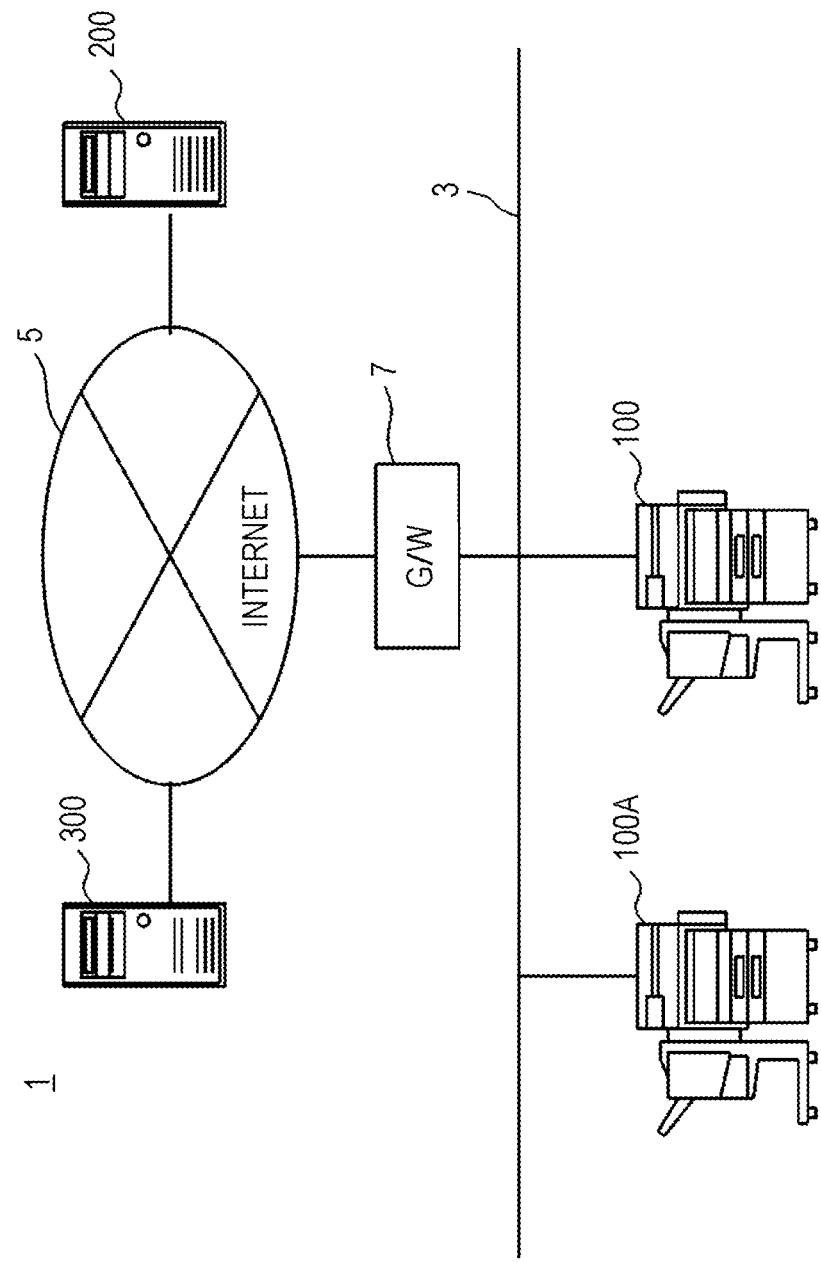
FIG. 1 is a diagram illustrating an example of an outline of an information processing system according to one embodiment of the present invention.

Hereinafter, one or more embodiments of the present invention will be described with reference to the drawings. However, the scope of the invention is not limited to the disclosed embodiments. In the following description, the same components are denoted by the same reference numerals. The same components have the same name and have the same functions. Therefore, detailed description thereof will not be repeated.

FIG. 1 is a diagram illustrating an example of an outline of an information processing system 1 according to one embodiment of the present invention. Referring to FIG. 1, the information processing system 1 includes MFPs 100 and 100A that function as image processing apparatuses, a management server 300 that manages the MFPs 100 and 100A, a service providing server 200 that provides a service, and a gateway (G/W) device 7.

The management server 300, the service providing server 200, and the G/W device 7 are each connected to an Internet 5 and can communicate with each other via the Internet 5.

The G/W device 7 is further connected to a local area network (LAN) 3. The MFPs 100 and 100A are each connected to the LAN 3. The G/W device 7 can communicate with the MFPs 100 and 100A connected to the LAN 3. Furthermore, each of the G/W device 7 and the MFPs 100 and 100A can communicate with another computer connected to the LAN 3.

The G/W device 7 has a firewall function and connects the LAN 3 inside a firewall and the Internet 5 outside the firewall. The G/W device 7 restricts access from a computer connected to the Internet 5 to the MFPs 100 and 100A connected to the LAN 3. Therefore, access to the MFPs 100 and 100A by the management server 300 and the service providing server 200 is restricted. The firewall function that the G/W device 7 has is not particularly limited, but is a packet filter type firewall function that determines whether to permit communication on the basis of an address included in a packet. Note that the firewall may be of an application type that acts as a proxy in communication with the outside and manages the communication at the level of a protocol of an application layer.

Each of the management server 300 and the service providing server 200 is a general computer. Thus, since a hardware configuration of each of the service providing server 200 and the management server 300 is well known, the description thereof will not be repeated here. In addition, since the MFPs 100 and 100A have the same hardware configuration and the same functions, the MFP 100 will be described here as an example.

Figure 2:
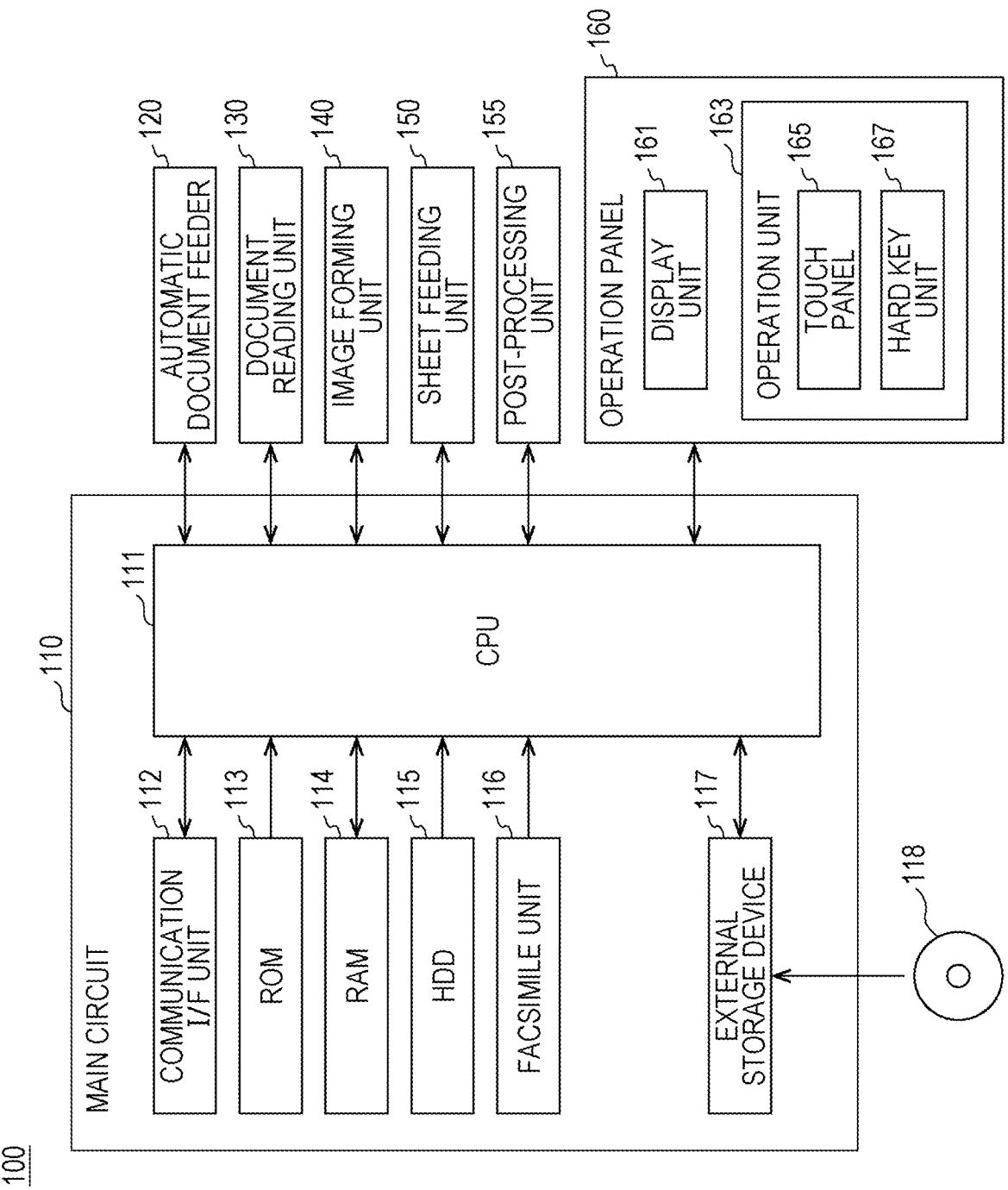
FIG. 2 is a block diagram illustrating an example of an outline of a hardware configuration of an MFP.

FIG. 2 is a block diagram illustrating an example of an outline of the hardware configuration of the MFP 100. Referring to FIG. 2, the MFP 100 includes a main circuit 110, a document reading unit 130 for reading a document, an automatic document feeder 120 for conveying the document to the document reading unit 130, an image forming unit 140 for forming an image on a sheet or the like on the basis of image data obtained by the document reading unit 130 reading and outputting the document, a sheet feeding unit 150 for supplying the sheet to the image forming unit 140, a post-processing unit 155 for processing the sheet on which the image has been formed, and an operation panel 160 as a user interface.

The post-processing unit 155 executes sorting processing of rearranging and ejecting one or more sheets on which an image has been formed by the image forming unit 140, punching processing of punching a hole, and stapling processing of driving a staple needle.

The main circuit 110 includes a CPU 111, a communication interface (I/F) unit 112, a read only memory (ROM) 113, a random access memory (RAM) 114, a hard disk drive (HDD) 115 as a mass storage device, a facsimile unit 116, and an external storage device 117 to which a compact disk ROM (CD-ROM) 118 is attached. The CPU 111 is connected to the automatic document feeder 120, the document reading unit 130, the image forming unit 140, the sheet feeding unit 150, the post-processing unit 155, and the operation panel 160 and controls the entire MFP 100.

The ROM 113 stores a program to be executed by the CPU 111 or data necessary for executing the program. The RAM 114 is used as a work area when the CPU 111 executes a program. In addition, the RAM 114 temporarily stores read data (image data) continuously sent from the document reading unit 130.

The operation panel 160 is provided on the upper surface of the MFP 100 and includes a display unit 161 and an operation unit 163. The display unit 161 is a display device such as a liquid crystal display or an organic electroluminescence display and displays an instruction menu for a user, information regarding acquired image data, and the like. The operation unit 163 includes a hard key unit 167 including a plurality of keys and accepts inputs of various instructions and data such as characters and numbers by the user's operations corresponding to the keys. The operation unit 163 further includes a touch panel 165 provided on the display unit 161.

The communication I/F unit 112 is an interface for connecting the MFP 100 to the LAN 3. The CPU 111 communicates with a device connected to the LAN 3 via the communication I/F unit 112 and transmits and receives data. Furthermore, the communication I/F unit 112 can communicate with the computer connected to the Internet 5, for example, the management server 300 and the service providing server 200 via the G/W device 7.

The facsimile unit 116 is connected to a public switched telephone network (PSTN) and transmits facsimile data to the PSTN or receives facsimile data from the PSTN. The facsimile unit 116 stores the received facsimile data in the HDD 115 or outputs the facsimile data to the image forming unit 140. The image forming unit 140 prints the facsimile data received by the facsimile unit 116 on the sheet. In addition, the facsimile unit 116 converts data stored in the HDD 115 into facsimile data and transmits the facsimile data to a facsimile device connected to the PSTN.

A CD-ROM 118 is attached to the external storage device 117. The CPU 111 can access the CD-ROM 118 via the external storage device 117. The CPU 111 loads into the RAM 114 a program recorded in the CD-ROM 118 attached to the external storage device 117 and executes the program. Note that a medium that stores the program to be executed by the CPU 111 is not limited to the CD-ROM 118 and may be an optical disc (magnetic optical disc/mini disc/digital versatile disc), an integrated circuit card, an optical card, or a semiconductor memory such as a mask ROM or an erasable programmable ROM.

In addition, the CPU 111 may load a program stored in the HDD 115 into the RAM 114 and execute the program. In this case, another computer connected to the LAN 3 or the Internet 5 may rewrite the program stored in the HDD 115 of the MFP 100 or add a new program and write in the program. Furthermore, the MFP 100 may download a program from another computer connected to the LAN 3 or the Internet 5 and store the program in the HDD 115. The program mentioned here includes not only a program that can be directly executed by the CPU 111 but also a source program, a program that has been subjected to compression processing, an encrypted program, and the like.

In the information processing system 1 according to the present embodiment, the service providing server 200 is accessed from the MFP 100 connected to the LAN 3 inside the firewall and executes processing for providing a service according to an instruction by the user who operates the MFP 100. Note that the service providing server 200 may be accessed from a personal computer (PC) connected to the Internet 5 outside the firewall and execute processing for providing a service according to an instruction by a user who operates the PC.

The service provided by the service providing server 200 includes a service that executes cooperative processing in cooperation with each of the MFPs 100 and 100A. The cooperative processing includes first processing executed by the MFPs 100 and 100A and second processing executed by the service providing server 200. Although not specified, the second processing includes file management processing of storing data, image processing executed with the image data as an object to be processed, translation processing executed with text data as an object to be processed, voice recognition processing of executing sound data as processing data, voice synthesis processing of converting text data into voice, and the like.

In a case where the service providing server 200 provides the service that executes the cooperative processing, the service providing server 200 transmits an application programming interface (API) command to the MFPs 100 and 100A in order to cause the MFPs 100 and 100A to execute the first processing. Each of the MFPs 100 and 100A executes processing according to the API command.

In the information processing system 1, the service providing server 200 connected to the Internet 5 outside the firewall can control any of the MFPs 100 and 100A connected to the LAN 3 inside the firewall. Specifically, the management server 300 mediates between the service providing server 200 and the MFP 100.

FIG. 3 is a diagram illustrating an outline of a flow of the cooperative processing. FIG. 3 illustrates, in time series, an example of processing executed by and an example of data transmitted and received by each of the MFP 100, the management server 300, and the service providing server 200. Here, description will be given by taking, as an example, a case where the first processing included in the cooperative processing determines scan processing of reading the document and data transmitting processing of returning image data obtained by the scan processing, and the second processing determines processing of storing the image data. In this case, the MFP 100 receives the API command transmitted from the service providing server 200 via the management server 300. The MFP 100 executes the API command to transmit the image data obtained by reading the document to the service providing server 200 via the management server 300. When receiving the image data from the management server 300, the service providing server 200 stores the image data.

Referring to FIG. 3, the MFP 100 stores a network address of the management server 300 in advance and requests a connection for communicating with the management server 300 using the network address.

The management server 300 establishes a communication session for communicating with the MFP 100 in response to the request for the connection from the MFP 100. Hereinafter, the communication session established between the management server 300 and the MFP 100 is referred to as a second communication path. The MFP 100 is inside the firewall, and the management server 300 is outside the firewall. Thus, the second communication path is a communication session passing through the firewall. Note that a second communication path is established with the management server 300 also in the MFP 100A different from the MFP 100. Therefore, the management server 300 can communicate with the MFP 100 via the second communication path established with the MFP 100 and communicate with MFP 100A via the second communication path established with MFP 100A.

The second communication path is a communication session for communicating between the MFP 100 and the management server 300. A communication protocol such as Message Queueing Telemetry Transport is used for the second communication path. In addition, a message in a format such as JavaScript (registered trademark) Object Notation may be transmitted and received between the management server 300 and the MFP 100.

FIG. 4 is a diagram illustrating an example of a message transmitted from the management server 300 to the MFP 100. Referring to FIG. 4, the message transmitted from the management server 300 to the MFP 100 indicates that type is "job" and the "job" is a scan job that determines the scan processing. In addition, a color and single side reading are specified as setting values, and pdf is specified as an output format. Thus, processing of reading single side of the document in color and converting image data obtained by the reading into a pdf format is determined.

Returning to FIG. 3, the MFP 100 connects to the service providing server 200 and sets the cooperative processing in response to the input of a uniform resource locator (URL) of the service providing server 200 by the user. HTML is used as a communication protocol here. Hereinafter, a communication session between the MFP 100 and the service providing server 200 is referred to as a first communication path. Since the MFP 100 inside the firewall requests a connection from the service providing server 200 outside the firewall, a communication session for communicating between the MFP 100 and the service providing server 200 passes through the firewall.

A setting of the cooperative processing includes a setting of the first processing executed by the MFP 100 and a setting of the second processing executed by the service providing server 200. The service providing server 200 generates an API command for causing the MFP 100 to execute the first processing according to the setting of the first processing and transmits the API command to the management server 300. A well-known technique is used as a technique for specifying the management server 300 as a transmission destination of the API command. For example, since the service providing server 200 accepts the setting of the cooperative processing from the MFP 100, the management server 300 is specified on the basis of the MFP 100 that is the origin of setting the cooperative processing. The service providing server 200 may be notified of the output destination of the API command at a stage when the MFP 100 sets the cooperative processing.

In a case where the management server 300 receives the API command addressed to the MFP 100 from the service providing server 200, the management server 300 transmits the API command to the MFP 100 via the second communication path. The MFP 100 executes the first processing according to the API command and transmits an execution result to the management server 300 via the second communication path. The management server 300 transmits the execution result to the service providing server 200. When receiving the execution result, the service providing server 200 executes the second processing with the execution result as an object to be processed.

For example, as an example of the cooperative processing, there is processing of storing data obtained by reading the document by the MFP 100 in the service providing server 200. In the cooperative processing, the first processing includes scan processing of reading the document and processing of returning image data obtained by executing the scan processing. The second processing is processing of storing the image data. In a case where a command for executing the cooperative processing is set by the user in the service providing server 200, the service providing server 200 transmits, to the MFP 100, an API command for executing the scan processing of reading the document and an API command for returning the image data obtained by executing the scan processing in order to cause the MFPs 100 and 100A to execute the first processing. When receiving the image data from the MFP 100, the service providing server 200 executes the second processing that stores the image data.

Figure 5:
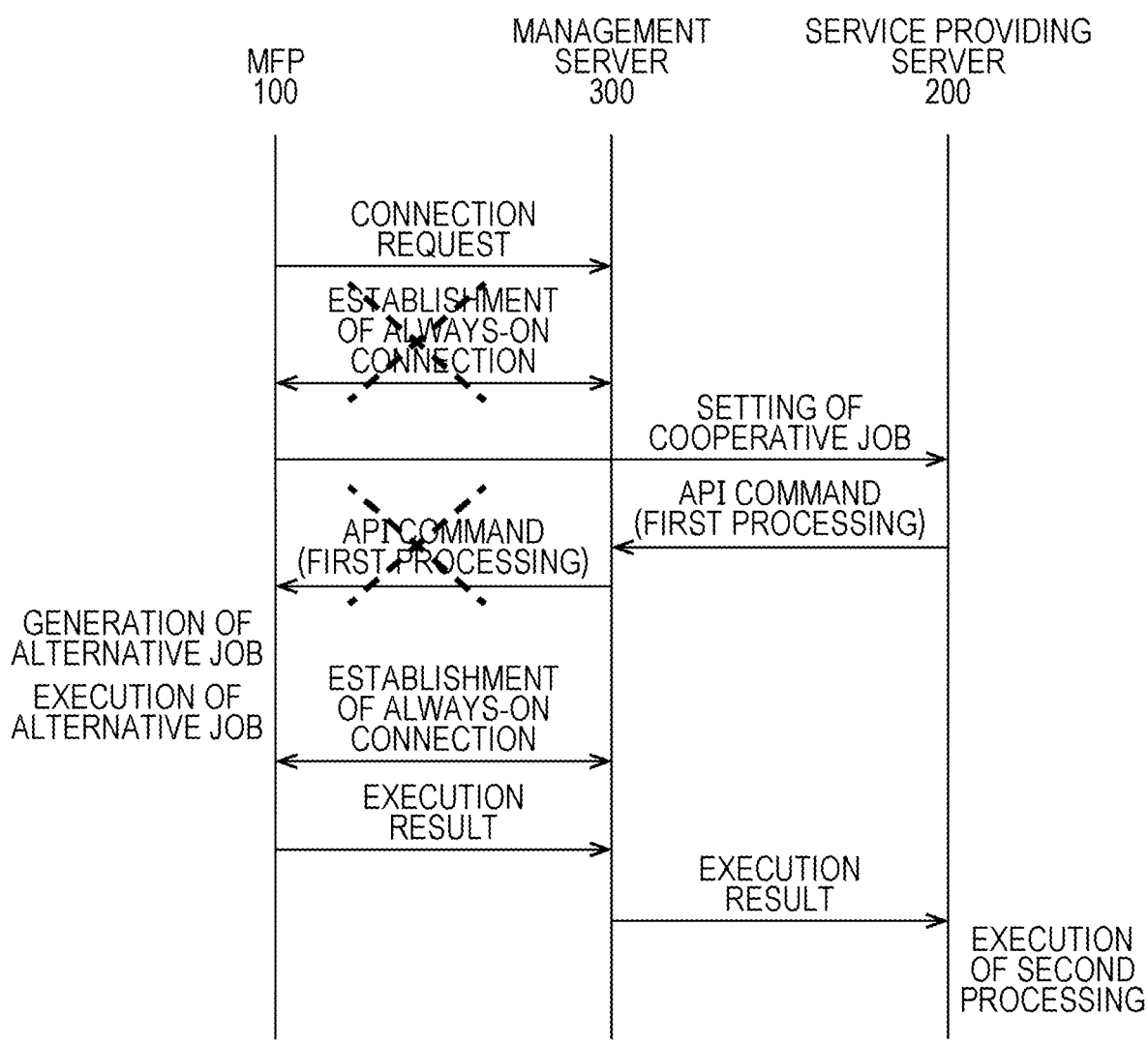
FIG. 5 is a diagram illustrating an outline of a flow of the cooperative processing when a communication failure occurs.

FIG. 5 is a diagram illustrating an outline of a flow of the cooperative processing when a communication failure occurs. FIG. 5 illustrates a state in which a failure occurs in communication between the MFP 100 and the management server 300 and the second communication path cannot be established. Referring to FIG. 5, the MFP 100 establishes the first communication path with the service providing server 200 without establishing the second communication path with the management server 300. Specifically, the MFP 100 establishes the first communication path with the service providing server 200 in response to the input of the URL of the service providing server 200 by the user. Then, the cooperative processing is set in the service providing server 200 according to an operation input by the user to the MFP 100. HTML is used as a communication protocol here. Since the MFP 100 inside the firewall requests a connection from the service providing server 200 outside the firewall, a communication session for communicating between the MFP 100 and the service providing server 200 passes through the firewall.

A setting of the cooperative processing includes a setting of the first processing executed by the MFP 100 and a setting of the second processing executed by the service providing server 200. The service providing server 200 generates an API command for causing the MFP 100 to execute the first processing according to the setting of the first processing and transmits the API command to the management server 300. In a case where the management server 300 receives the API command addressed to the MFP 100 from the service providing server 200, since the second communication path is not established with the MFP 100, the management server 300 cannot transmit the API command.

In the MFP 100, it is detected that the API command is not received, and an alternative job is generated and executed. The alternative job is generated when the user inputs a setting for executing the first processing to the MFP 100. Since the user has input the setting for executing the first processing when setting the cooperative processing in the service providing server 200, the user again inputs the same setting in the MFP 100. Note that a setting screen when the cooperative processing has been set in the service providing server 200 and a setting screen that accepts the input of the setting for executing the first processing may be displayed side by side on the operation unit 163.

Then, the MFP 100 executes the alternative job. An execution result of the alternative job is temporarily stored in the RAM 114 until the second communication path is established between the MFP 100 and the management server 300. The execution result is transmitted to the management server 300 via the second communication path in response to the establishment of the second communication path.

The management server 300 transmits the execution result to the service providing server 200. When receiving the execution result, the service providing server 200 executes the second processing with the execution result as an object to be processed. Hereinafter, the operation of the MFP 100 will be described in detail.

Figure 6:
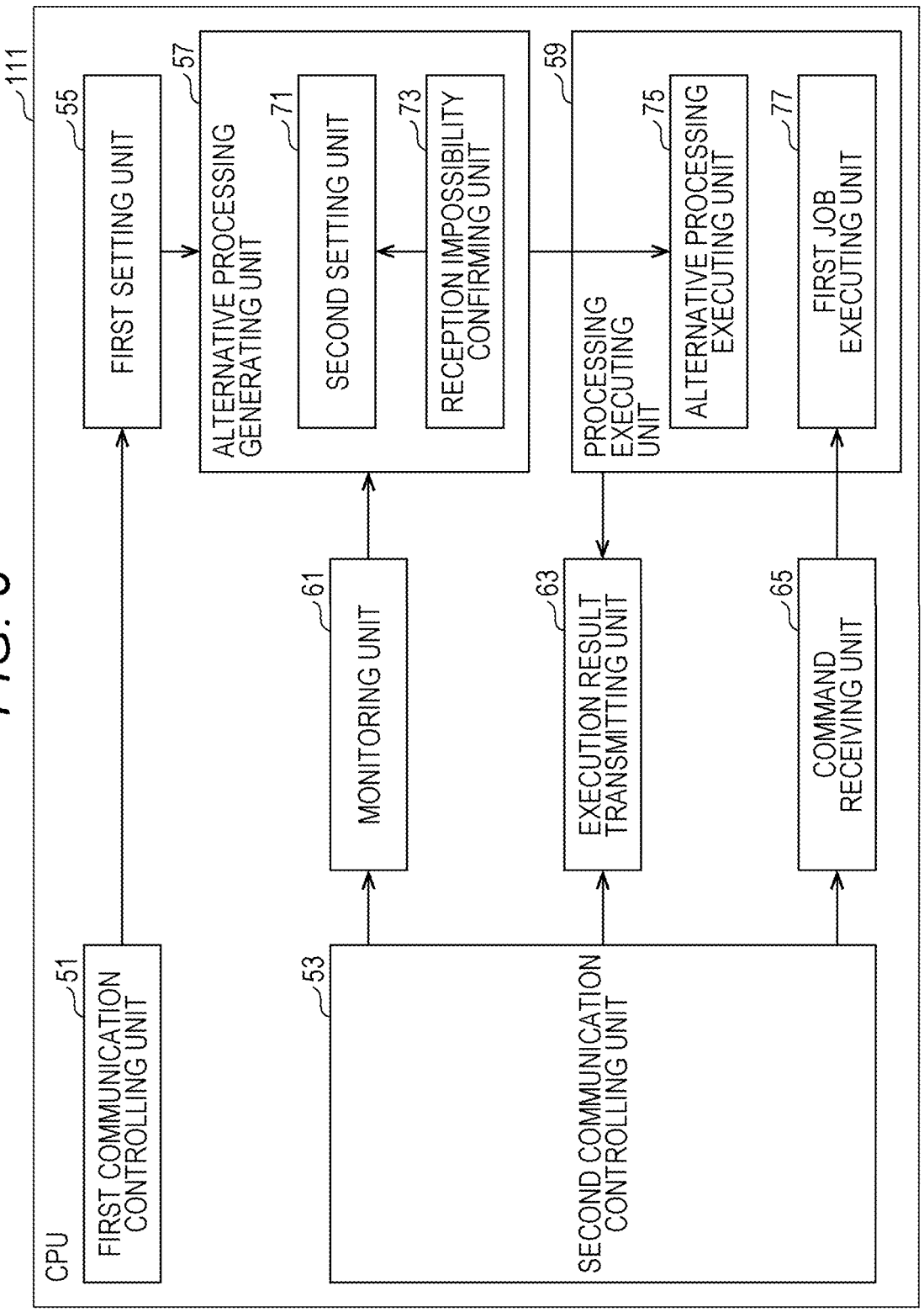
FIG. 6 is a block diagram illustrating an example of functions of a central processing unit (CPU) included in the MFP.

FIG. 6 is a block diagram illustrating an example of functions of the CPU 111 included in the MFP 100. The functions illustrated in FIG. 6 are functions achieved by the CPU 111 when the CPU 111 included in the MFP 100 executes a cooperative processing execution program stored in the ROM 113, the HDD 115, or the CD-ROM 118. Referring to FIG. 6, the CPU 111 included in the MFP 100 includes a first communication controlling unit 51, a second communication controlling unit 53, a first setting unit 55, an alternative processing generating unit 57, a processing executing unit 59, a monitoring unit 61, an execution result transmitting unit 63, and a command receiving unit 65.

The first communication controlling unit 51 establishes the first communication path with the service providing server 200. Specifically, the first communication controlling unit 51 controls the communication I/F unit 112 to transmit a signal for requesting the service providing server 200 to start communication using the URL for the service provided by the service providing server 200 and establishes the first communication path with the service providing server 200. The first communication controlling unit 51 outputs a first communication path ID for identifying the first communication path to the first setting unit 55.

The second communication controlling unit 53 establishes the second communication path with the management server 300. Specifically, the second communication controlling unit 53 controls the communication I/F unit 112 to transmit a signal requesting the management server 300 to establish the second communication path using the network address of the management server 300 and establishes the second communication path with the management server 300. The second communication controlling unit 53 acquires the network address of the management server 300 stored in the HDD 115. When the second communication path is established, the second communication controlling unit 53 outputs a second communication path ID for identifying the second communication path to the monitoring unit 61, the execution result transmitting unit 63, and the command receiving unit 65.

The first setting unit 55 is a task in which the CPU 111 executes a browsing program. The browsing program determines processing of communicating with a computer on the Internet and displaying a web page stored in the computer and processing of returning an operation input by the user to the web page. Note that a program is not limited to the browsing program as long as the program is installed in the MFP 100 to receive the service provided by the service providing server 200.

The first setting unit 55 controls the communication I/F unit 112 to communicate with the service providing server 200 using the first communication path specified by the first communication path ID and receives an operation screen from the service providing server 200. The operation screen is a cooperation setting screen that accepts the setting of the cooperative processing. The first setting unit 55 displays the cooperation setting screen on the display unit 161 and accepts the setting of the cooperative processing according to an operation input by the user to the operation unit 163. The first setting unit 55 controls the communication I/F unit 112 to transmit the setting of the cooperative processing to the service providing server 200 using the first communication path specified by the first communication path ID. As a result, the cooperative processing is set in the service providing server 200. The cooperative processing includes the first processing and the second processing.

In a case where the cooperative processing is set, the service providing server 200 transmits the API command for causing the MFP 100 to execute the first processing to the management server 300. The management server 300 transmits the API command to the MFP 100 via the second communication path established with the MFP 100 in response to the reception of the API command addressed to the MFP 100.

The command receiving unit 65 receives a command from the service providing server 200 via the second communication path. Specifically, the command receiving unit 65 controls the communication I/F unit 112 to receive the API command transmitted from the management server 300 via the second communication path. The API command received from the management server 300 is a command output from the service providing server 200 to the MFP 100. The command receiving unit 65 outputs the API command to a processing executing unit 59.

The processing executing unit 59 controls a hardware resource included in the MFP 100 to execute processing. The hardware resource includes an automatic document feeder 120, a document reading unit 130, an image forming unit 140, a sheet feeding unit 150, a communication I/F unit 112, an HDD 115, and a facsimile unit 116. Therefore, the processing executed by the processing executing unit 59 includes scan processing in which the document reading unit 130 reads the document, image forming processing in which the image forming unit 140 forms an image on a sheet supplied from the sheet feeding unit 150, data processing in which data is stored in the HDD 115, and data transmitting/receiving processing in which data is transmitted/received by controlling the communication I/F unit 112 or the facsimile unit 116. In addition, the image processing includes processing of converting an image of the image data by the CPU 111. The image processing includes sharpening processing of emphasizing an edge of the image, smoothing processing of smoothing the edge of the image, color conversion processing of converting a color, and format conversion processing of converting a format of the image data.

The processing executing unit 59 includes an alternative processing executing unit 75 and a first job executing unit 77. The first job executing unit 77 executes processing according to the API command in response to the input of the API command from the command receiving unit 65. Note that in a case where the API command is input to the first job executing unit 77, the input is done after the user operates the operation unit 163 to log in to the service provided by the service providing server 200.

There is a case where even when the second communication controlling unit 53 requests the management server 300 to establish the second communication path, the second communication path is not established. For example, there is a case where the second communication path is not established due to a communication error or the like. The monitoring unit 61 monitors the communication I/F unit 112 and determines whether the second communication path has been established. Ina case where the second communication path is not established or in a case where the established second communication path has been disconnected, the monitoring unit 61 outputs a non-connection signal indicating that the second communication path is not established to the alternative processing generating unit 57.

In a case where a non-connection signal is input from the monitoring unit 61 after the cooperative processing has been set by the first setting unit 55, the alternative processing generating unit 57 generates alternative processing. In a case where the monitoring unit 61 detects that the second communication path is not established, the command receiving unit 65 does not receive a command from the service providing server 200 via the second communication path. Therefore, the first processing is not executed by the first job executing unit 77. The alternative processing generating unit 57 generates alternative processing in place of the first processing.

The alternative processing generating unit 57 includes a second setting unit 71 and a reception impossibility confirming unit 73. The reception impossibility confirming unit 73 confirms that the API command cannot be received. The reception impossibility confirming unit 73 outputs a setting instruction to the second setting unit 71 in response to the confirmation that the API command cannot be received.

In a case where a non-connection signal is input from the monitoring unit 61 after the first setting unit 55 detects that the cooperative processing has been set, the reception impossibility confirming unit 73 confirms that the API command cannot be received. Furthermore, in a case where a predetermined state is detected in addition to a state in which the non-connection signal is input from the monitoring unit 61, the reception impossibility confirming unit 73 confirms that the API command cannot be received. The predetermined state includes a first state in which the user is logged into the MFP 100. In addition, the predetermined state includes a second state in which the browsing program is started and a communication session has been established with an external computer by the communication I/F unit 112. In addition, the predetermined state includes a third state in which a service provided by the external computer that is a communication destination is a predetermined type of service. The predetermined type of service is a service that transmits an API command. In addition, the predetermined state includes a fourth state in which an operation screen for accepting a setting for execution using the hardware resource of the MFP 100 is not displayed on the display unit 161. In a case where all the states of at least one or more sets of the first to fourth states are detected, the reception impossibility confirming unit 73 determines that the API command cannot be received. A combination of the first to fourth states is determined in advance.

Note that there is a case where in the service provided by the service providing server 200, the first processing includes the scan processing. In this case, the predetermined state further includes a fifth state in which the document is placed on a document tray. In a case where all the states of at least one or more sets of the first to fifth states are detected, the reception impossibility confirming unit 73 determines that the API command cannot be received. A combination of the first to fifth states is determined in advance.

The second setting unit 71 sets the alternative processing in response to the input of the setting instruction from the reception impossibility confirming unit 73. Specifically, the second setting unit 71 displays an alternative setting screen for setting the alternative processing on the display unit 161 and accepts a setting according to an operation input by the user to the operation unit 163. In a case where the cooperation setting screen received by the first setting unit 55 from the service providing server 200 is displayed on the display unit 161, the second setting unit 71 includes a setting screen display unit that displays the alternative setting screen side by side with the cooperation setting screen. A setting input on the alternative setting screen is preferably the same as the setting for executing the first processing set on the cooperation setting screen. Therefore, the user can set the alternative processing in an area where the alternative setting screen is displayed while viewing the setting for executing the first processing displayed on the cooperation setting screen.

The alternative processing generating unit 57 outputs the setting of the alternative processing set by the second setting unit 71 to the alternative processing executing unit 75 of the processing executing unit 59. The alternative processing executing unit 75 executes the alternative processing according to the setting of the alternative processing set by the second setting unit 71.

In a case where it is determined that the API command cannot be received on the basis of only the state in which the non-connection signal is input from the monitoring unit 61, the alternative setting screen may be displayed on the display unit 161 even though the service providing server 200 does not transmit the API command. In a case where all the states of the at least one or more sets of the first to fifth states are detected by the reception impossibility confirming unit 73, it is determined that the API command cannot be received. Thus, it is confirmed that the API command cannot be received even though the service providing server 200 has transmitted the API command. Therefore, in a case where the service providing server 200 does not transmit the API command, the alternative setting screen can be prevented from being displayed on the display unit 161.

The execution result transmitting unit 63 transmits an execution result obtained as a result of execution of the alternative processing by the alternative processing executing unit 75. Specifically, the execution result transmitting unit 63 controls the communication I/F unit 112 to transmit the execution result to the management server 300 using the second communication path established by the second communication controlling unit 53. There is a case where the second communication path in which a communication failure has occurred once is recovered by the second communication controlling unit 53. The execution result transmitting unit 63 transmits the execution result to the management server 300 using the second communication path recovered by the second communication controlling unit 53.

Note that the execution result transmitting unit 63 may control the communication I/F unit 112 to transmit the execution result to the service providing server 200 via the first communication path. There is a case where a state in which the first communication path has been established is continuing, and in this case, the execution result transmitting unit 63 can transmit the execution result via the first communication path without waiting for recovery of the second communication path. In addition, the execution result transmitting unit 63 may establish, with the management server 300, a third communication path different from the first communication path and the second communication path and transmit the execution result to the management server 300 via the third communication path. Also in this case, the execution result transmitting unit 63 can transmit the execution result via the third communication path without waiting for recovery of the second communication path. In addition, the third communication path may be established with the service providing server 200. Also in this case, the execution result transmitting unit 63 can transmit the execution result via the third communication path without waiting for recovery of the second communication path.

In a case where the setting instruction is input from the reception impossibility confirming unit 73, the second setting unit 71 displays a connection error notification screen on the display unit 161.

Figure 7:
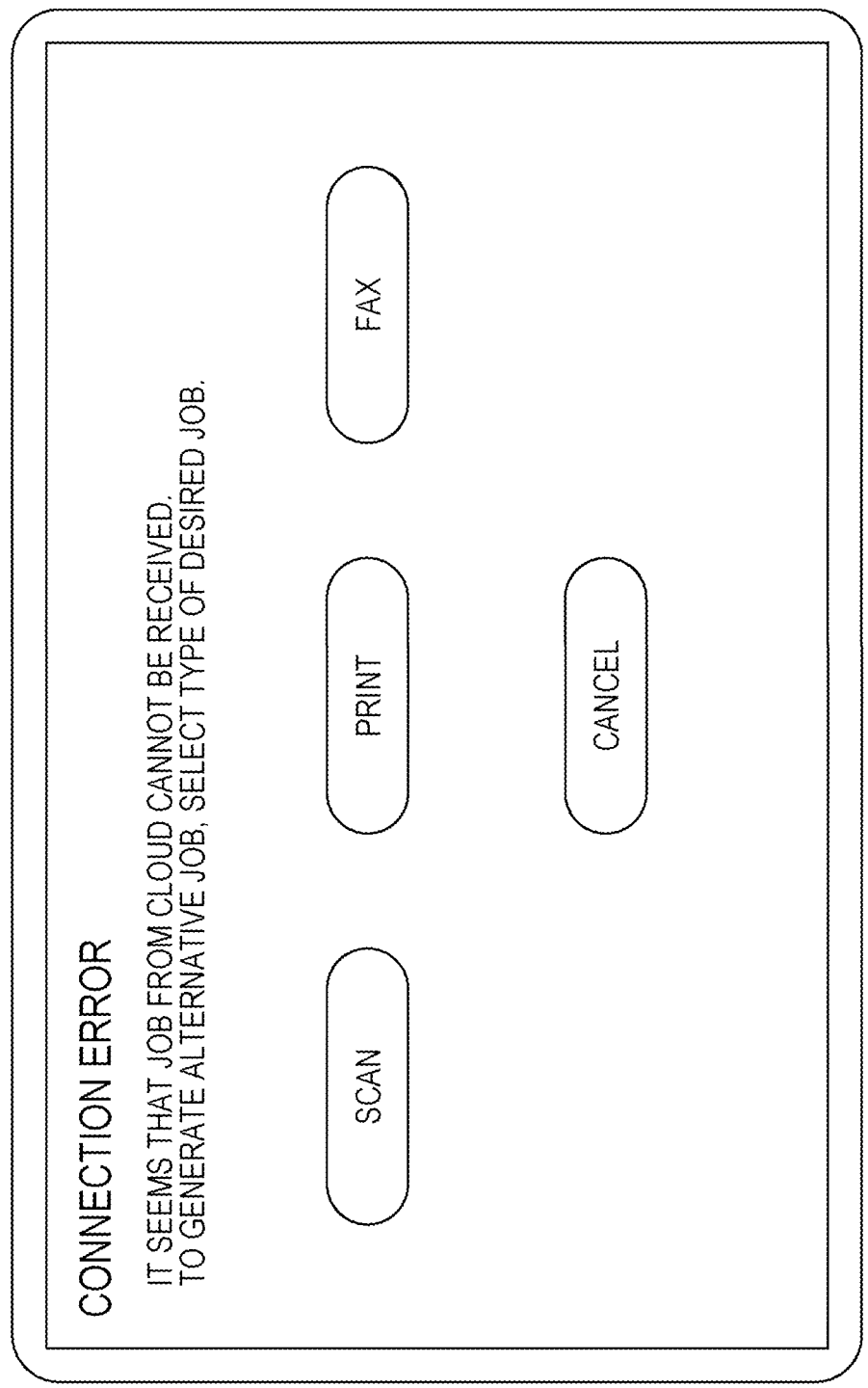
FIG. 7 is a diagram illustrating an example of a connection error notification screen.

FIG. 7 is a diagram illustrating an example of the connection error notification screen. Referring to FIG. 7, the connection error notification screen includes a message notifying a connection error and three buttons for selecting the type of the alternative processing. The message notifying a connection error includes "It seems that job from cloud cannot be received". In addition, the connection error notification screen includes a message prompting input of an alternative job. The message prompting the input of an alternative job includes "To generate alternative job, select type of desired job".

The three buttons for selecting the type of the alternative processing include a button indicating characters of scan for selecting the scan processing, a button indicating characters of print for selecting print processing, and a button indicating characters of fax for selecting facsimile transmission. When the button indicating characters of scan is instructed, a setting screen for setting the scan processing is displayed. When the button representing the characters of print is instructed, a setting screen for setting the print processing is displayed. When the button representing the characters of fax is instructed, a setting screen for setting fax transmitting processing is displayed.

Figure 8:
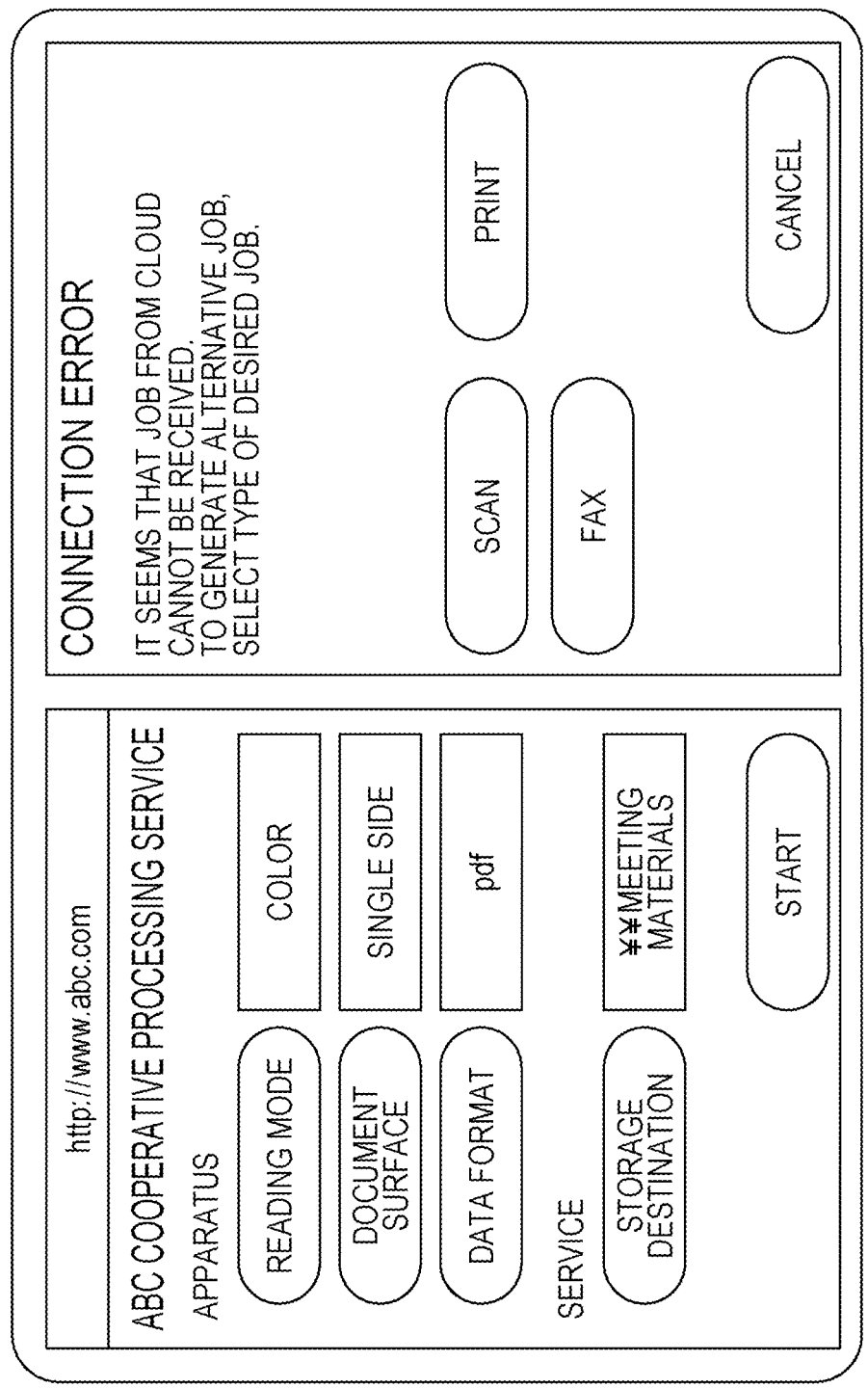
FIG. 8 is a diagram illustrating an example of a state in which the connection error notification screen is displayed.

FIG. 8 is a diagram illustrating an example of a state in which the connection error notification screen is displayed. FIG. 8 illustrates the connection error notification screen displayed while a cooperative processing setting screen is displayed on the display unit 161. A window of the cooperative processing setting screen and a window of the connection error notification screen illustrated in FIG. 7 are arranged on the display unit 161. The window of the cooperative processing setting screen includes http://www.abc.com is displayed as the URL of the service provided by the service providing server 200 and ABD cooperative processing as a service name. In addition, a state in which the scan processing is set as the first processing and storage processing is set as the second processing is illustrated. As setting values of the scan processing, color is set for an item for setting a reading mode, single side is set for an item for setting a reading surface of the document, and pdf is set for a data format. Therefore, it is illustrated that processing of outputting the image data obtained by reading the single side of the document in color in a pdf data format is set as the first processing. In addition, as a setting value of the storage processing, Ymeeting materials is set for an item for setting a storage destination folder. Therefore, it is illustrated that processing of storing pdf format data obtained by executing the first processing in a folder whose folder name is meeting materials is set.

Since the user can confirm the setting contents of the first processing by viewing the window of the cooperative processing setting screen, the user can know that the scan processing should be set as the alternative processing. When the button indicating characters of scan included in the window of the connection error notification screen is instructed, the setting screen for setting the scan processing is displayed as alternative processing setting screen. In this case, the window of the connection error notification screen is switched to a window of the alternative processing setting screen.

Figure 9:
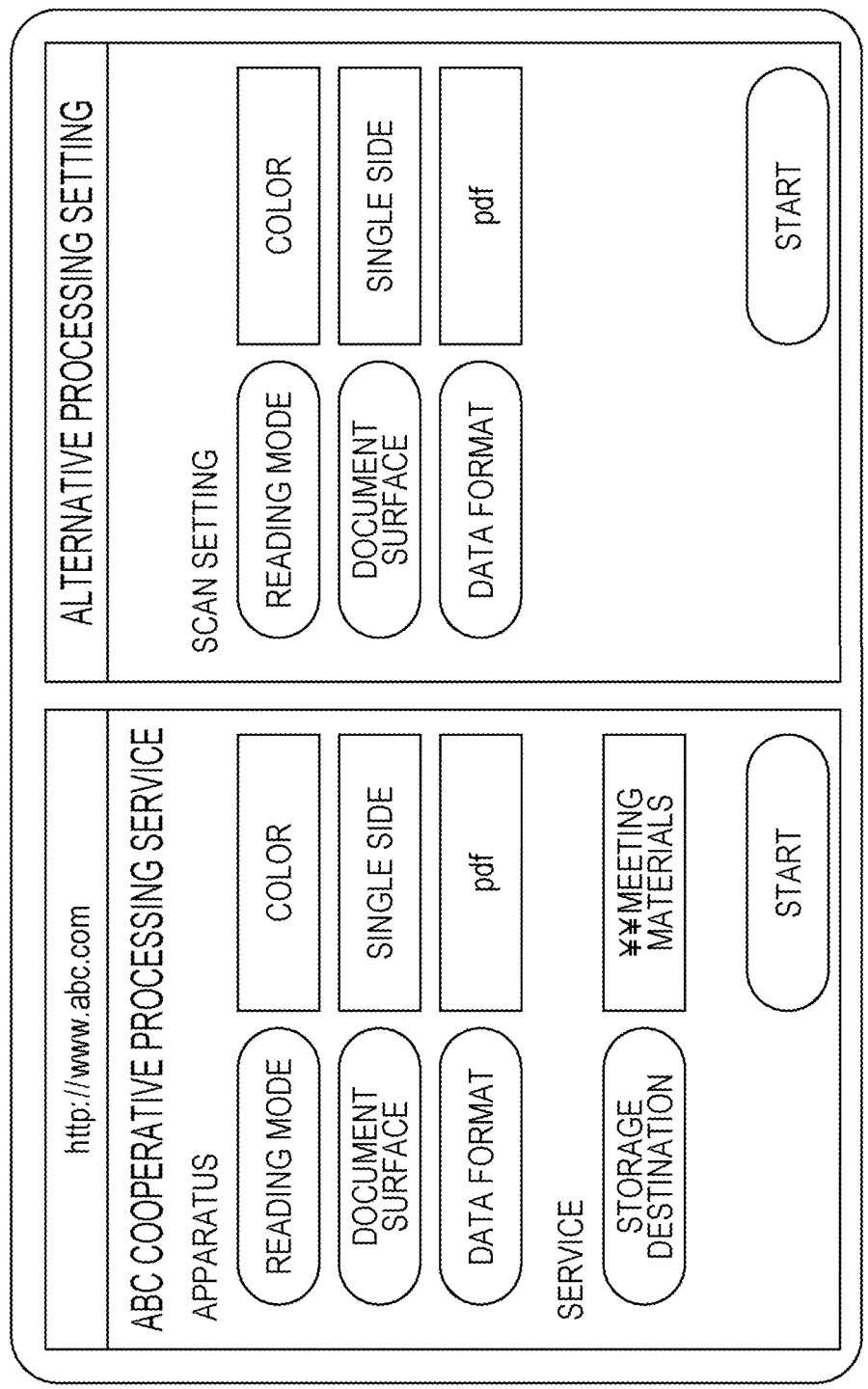
FIG. 9 is a diagram illustrating an example of an alternative processing setting screen.

FIG. 9 is a diagram illustrating an example of the alternative processing setting screen. The alternative processing setting screen illustrated in FIG. 9 is displayed in response to the button indicating characters of scan being instructed on the connection error notification screen illustrated in FIG. 7 or the connection error notification screen illustrated in FIG. 8. Referring to FIG. 9, the alternative processing setting screen is displayed in place of the connection error notification screen illustrated in FIG. 8. Therefore, the user can set the scan processing on the alternative processing setting screen while viewing the cooperative processing setting screen.

Figure 10:
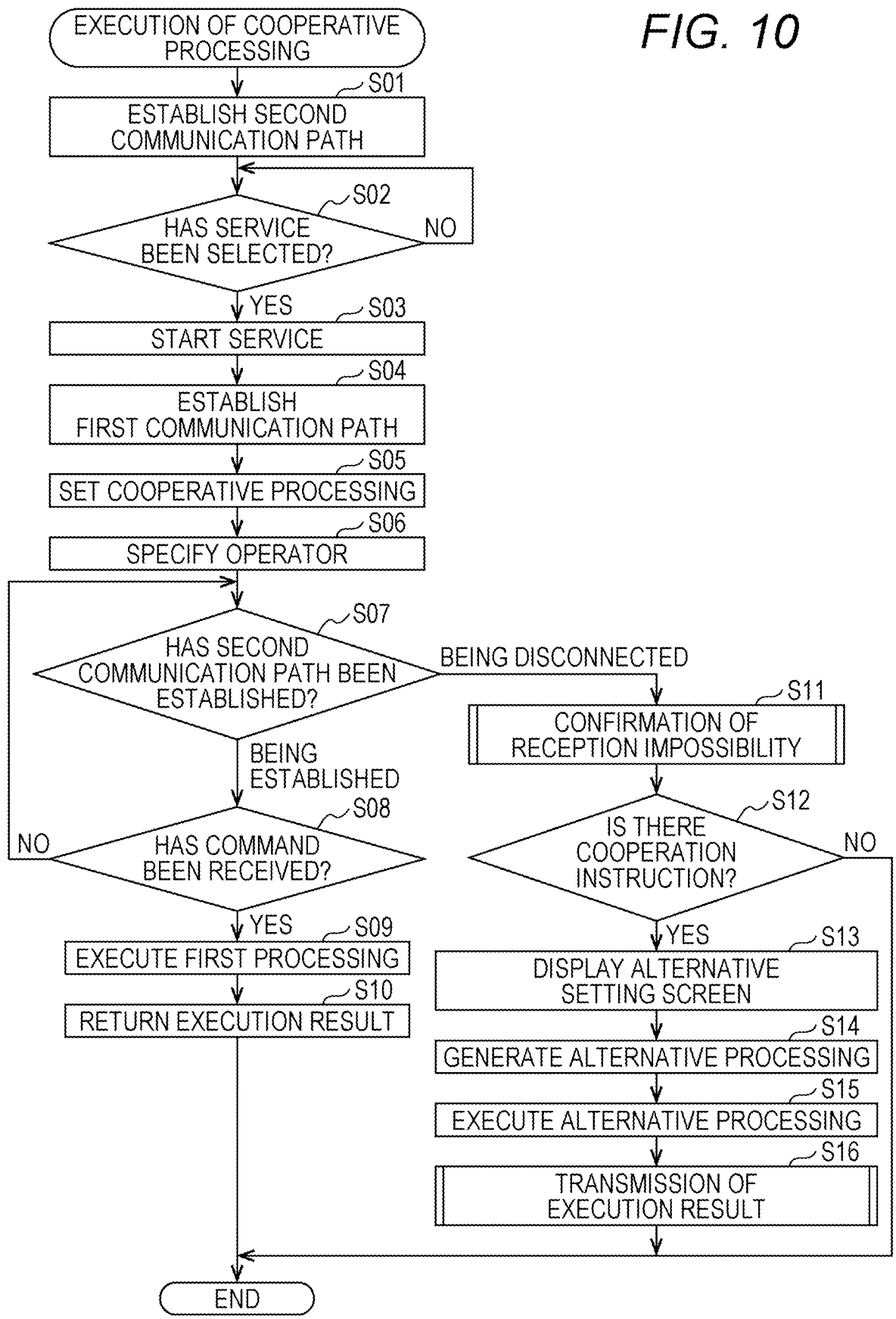
FIG. 10 is a flowchart illustrating an example of a flow of cooperative processing executing processing.

FIG. 10 is a flowchart illustrating an example of a flow of cooperative processing executing processing. The cooperative processing executing processing is processing executed by the CPU 111 included in the MFP 100 when the CPU 111 executes the cooperative processing execution program stored in the ROM 113, the HDD 115, or the CD-ROM 118. Referring to FIG. 10, the CPU 111 included in the MFP 100 controls the communication I/F unit 112 to establish the second communication path with the management server 300 (step S01), and the processing proceeds to step S02. Note that there is a case where the second communication path cannot be established due to a communication failure or the like, and in this case, the management server 300 is requested to establish the second communication path at a predetermined time interval to attempt to establish the second communication path.

In step S02, it is determined whether the service provided by the service providing server 200 has been selected by the user. A selection screen for selecting the service provided by the service providing server 200 is displayed on the display unit 161. When the operation unit 163 accepts an instruction to select the service by the user, a state goes into a standby state until the service is selected (NO in step S02), and when the service is selected, the processing proceeds to step S03. The selection of the service is, for example, an operation of instructing the URL assigned to the service.

In step S03, the service is started, and the processing proceeds to step S04. Specifically, the browsing program is started, and the task that executes the browsing program is caused to access the URL assigned to the service. In step S04, the first communication path is established, and the processing proceeds to step S05. The first communication path is a communication path established between the MFP 100 and the service providing server 200.

In step S05, the cooperative processing is set. The user operates the service providing server 200 via the task that executes the browsing program and sets the cooperative processing in the service providing server 200. The cooperative processing includes the first processing executed by the MFP 100 and the second processing executed by the service providing server 200. In step S06, an operator is specified, and the processing proceeds to step S07. An operator who has set the cooperative processing is set in the service providing server 200. In a case where the user who operates the MFP 100 is specified by authentication processing or the like executed by the MFP 100 in a stage before the cooperative processing executing processing is executed, the user is specified as the operator.

In step S07, a state of the second communication path is monitored. If the second communication path has been established, the processing proceeds to step S08, and otherwise the processing proceeds to step S11. There is a case where the second communication path is not established due to a communication failure or the like, and in addition, there is a case where the second communication path established once is disconnected.

In step S08, it is determined whether a command output from the service providing server 200 has been received. The command output from the service providing server 200 is received through the management server 300 via the second communication path. If the command output from the service providing server 200 has been received, the processing proceeds to step S09, and otherwise the processing returns to step S07. In step S09, the first processing is executed according to the command output from the service providing server 200, and the processing proceeds to step S10. The command output from the service providing server 200 is received as an API command via the second communication path. In step S10, an execution result obtained as a result of executing the first processing is returned, and the processing ends. The execution result is transmitted to the management server 300 via the second communication path.

A case where the processing proceeds to step S11 is a case where the second communication path is not established. In step S11, reception impossibility confirming processing is executed, and the processing proceeds to step S12. The reception impossibility confirming processing will be described in detail later and is processing for confirming that the command output from the service providing server 200 cannot be received. The reception impossibility confirming processing is executed, whereby the presence or absence of a cooperation instruction is determined.

In step S12, the processing branches according to the presence or absence of a cooperation instruction. In a case where it is determined in step S11 that there is a cooperation instruction, the processing proceeds to step S13, but in a case where it is determined that there is no cooperation instruction, the processing ends. In step S13, the alternative setting screen is displayed on the display unit 161, and the processing proceeds to step S14. The alternative setting screen is different from a first user interface provided by the browsing program and is a second user interface provided by the MFP 100. The first user interface is a user interface for setting processing to be executed by the service providing server 200, whereas the second user interface is a user interface for setting processing to be executed by the MFP 100.

In step S14, the alternative processing is generated, and the processing proceeds to step S15. The alternative processing is generated by setting the alternative processing according to an operation input by the user to the operation unit 163 via the second user interface. In step S15, the generated alternative processing is executed, and the processing proceeds to step S16. In step S16, execution result transmitting processing is executed, and the processing ends. The execution result transmitting processing will be described in detail later.

FIG. 11 is a flowchart illustrating an example of a flow of the reception impossibility confirming processing. The reception impossibility confirming processing is processing executed in step S11 of the cooperative processing executing processing. The user who has set the cooperative processing is specified as the operator in a stage before the reception impossibility confirming processing is executed. Referring to FIG. 11, the CPU 111 included in the MFP 100 determines whether the operator who has set the cooperative processing is logging in (step S21). If such an operator is logging in, the processing proceeds to step S22, and otherwise the processing proceeds to step S26.

In step S22, it is determined whether the first communication path is being established. When the first communication path is being established, a state in which the service is provided from the service providing server 200 is confirmed. If the first communication path is being established, the processing proceeds to step S23, and otherwise the processing proceeds to step S26.

In step S23, it is determined whether the service provided by the service providing server 200 includes the execution of the cooperative processing. If the service includes the execution of the cooperative processing, the processing proceeds to step S24, and otherwise the processing proceeds to step S26. This is because when the cooperative processing is not included, the execution of the first processing is not instructed.

In step S24, it is determined whether a setting screen for operating the MFP is displayed on the display unit 161. This is because in a case where the user operates the second user interface for operating the MFP, there is a low probability that the user has set the cooperative processing in the service provided by the service providing server 200.

In step S25, the presence of a cooperation instruction is set for a return value, and the processing returns to the cooperative processing executing processing. In step S26, the absence of a cooperation instruction is set for a return value, and the processing returns to the cooperative processing executing processing.

FIG. 12 is a flowchart illustrating an example of a flow of the execution result transmitting processing. The execution result transmitting processing is processing executed in step S16 of the cooperative processing executing processing. Referring to FIG. 12, the CPU 111 included in the MFP 100 determines whether the second communication path has recovered (step S31). If the second communication path has recovered and been established, the processing proceeds to step S32, and otherwise the processing proceeds to step S33. In step S32, an execution result is transmitted via the second communication path, and the processing returns to the cooperative processing executing processing.

In step S33, it is determined whether the first communication path has been established. If the first communication path has been established, the processing proceeds to step S34, and otherwise the processing proceeds to step S35. In step S34, an execution result is transmitted via the first communication path, and the processing returns to the cooperative processing executing processing.

In step S35, the third communication path, and the processing proceeds to step S36. The third communication path is a communication path established with the management server 300 or the service providing server 200. It is only necessary that it is determined in advance whether the third communication path is to be established with either the management server 300 or the service providing server 200. In step S36, an execution result is transmitted via the third communication path, and the processing returns to the cooperative processing executing processing.

<Modifications>

In the present embodiment, description has been given by taking, as an example, a case where the first processing executed by the MFP 100 in the cooperative processing set in the service providing server 200 is the scan processing, but the first processing is not limited to the scan processing. For example, the first processing may be processing of converting a format of data stored in an HDD 115. For example, there is a case where format conversion processing is set as the first processing in order to match to a data format of data to be processed in second processing.

In addition, the first processing may be image processing executed with respect to image data stored in the HDD 115. For example, in a case where the second processing determines character recognition processing, image processing such as edge enhancement processing may be set as the first processing in order to easily extract a character from the image data.

As described above, the MFP 100 according to the present embodiment functions as an image processing apparatus, sets the cooperative processing including the first processing and the second processing that cooperate with each other in the service providing server 200 that provides a service that determines the cooperative processing, and receives the first processing in response to the reception of a command to execute the first processing. In a case where it is detected that the command cannot be received after the cooperative processing has been set, the MFP 100 generates the alternative processing in place of the first processing and executes the alternative processing. Therefore, since the MFP 100 executes the alternative processing in place of the first processing of the cooperative processing set in the service providing server 200, the cooperative processing can be executed even in a case where the command of the service providing server 200 is not received. Thus, the user does not need to wait until the command of the service providing server 200 is received. Therefore, processing to be executed in cooperation with the service providing server 200 can be executed without waiting time of the user.

In addition, the MFP 100 determines that the command cannot be received in a case where the first communication path is established in order to communicate with the service providing server 200, the second communication path different from the first communication path is established in order to receive a command, a state of the second communication path is monitored, and a state in which communication through the second communication path is not possible is detected. Therefore, since the first communication path established in order to communicate with the service providing server 200 is different from the second communication path established in order to receive the command, the command for executing the first processing of the cooperative processing set in the service providing server 200 can be received from the service providing server 200.

In addition, the MFP 100 transmits an execution result obtained by executing the alternative processing to the service providing server 200 in response to the reception of the command. Therefore, since the execution result obtained by executing the alternative processing is transmitted to the service providing server 200, the cooperative processing is executed. Thus, the service providing server 200 can be caused to execute the cooperative processing.

In addition, the MFP 100 transmits the execution result according to a command received after recovery such that a state in which communication through the second communication path is possible is detected. Therefore, since the execution result obtained by executing the alternative processing is transmitted to the service providing server 200, the cooperative processing is executed. Thus, the cooperative processing can be executed even if the command is not received from the service providing server 200.

In addition, the MFP 100 transmits the execution result obtained by executing the alternative processing via a third communication path different from the second communication path. Therefore, since the execution result obtained by executing the alternative processing is transmitted to the service providing server 200, the cooperative processing is executed. Thus, the cooperative processing can be executed even if the command is not received from the service providing server 200.

In addition, the MFP 100 accepts a setting that determines the alternative processing and generates the alternative processing according to the received setting. Therefore, if the same setting as the setting of the first processing is accepted, the same processing as the cooperative processing can be executed.

In addition, in a case where it is detected that the command cannot be received after the cooperative processing has been set, when one or more predetermined states are detected, the MFP 100 generates the alternative processing, whereas when all of the one or more predetermined states are not detected, the MFP 100 does not generate the alternative processing. Therefore, it is possible to accurately detect that the command cannot be received.

In addition, the one or more predetermined states include a state in which the operator who has set the cooperative processing is continuing an operation. In a case where the operator who has set the cooperative processing is operating the MFP 100, there is a high possibility that the cooperative processing has been set, and thus it is possible to accurately determine that the command is not received.

In addition, the one or more predetermined states include a state in which the first communication path used for the setting of the cooperative processing has been established. In a case where the first communication path has been established, there is a high probability that the cooperative processing has been set, and thus it is possible to accurately determine that the command is not received.

In addition, the MFP 100 displays the alternative processing setting screen side by side with the cooperation setting screen. Therefore, since the alternative processing can be set while the cooperation setting screen is viewed, an operation of setting, as the alternative processing, the same setting as the setting of the first processing of the cooperative processing becomes easy.

<Supplementary Notes>

(1) The cooperative processing execution method according to claim 11, further including:
- a first communication controlling step in which a first communication path is established in order to communicate with a server in a first setting step;
- a second communication controlling step in which a second communication path different from the first communication path is established in order to receive a command; and
- a monitoring step in which a state of the second communication path is monitored, in which
- an alternative processing generating step includes a step in which it is determined that the command cannot be received in a case where a state in which communication through the second communication path is not possible is detected in the monitoring step.

(2) The cooperative processing execution method according to (1), further including an execution result transmitting step in which an execution result obtained by executing alternative processing in an alternative processing executing step is transmitted to the server in response to the reception of the command in a command receiving step.

(3) The cooperative processing execution method according to (2), in which the execution result transmitting step includes a step in which the execution result is transmitted according to the command received in the command receiving step after recovery such that a state in which communication through the second communication path is possible is detected in the monitoring step.

(4) The cooperative processing execution method according to (2), further including an execution result transmitting step in which the execution result obtained by executing the alternative processing in the alternative processing executing step is transmitted via a communication path different from the second communication path.

(5) The cooperative processing execution method according to any one of claim 11 and (1) to (4), further including a second setting step in which a setting that determines the alternative processing is accepted, in which the alternative processing generating step includes a step in which the alternative processing is generated according to the setting accepted in the second setting step.

(6) The cooperative processing execution method according to any one of claim 11 and (1) to (5), in which in a case where it is detected that the command cannot be received after cooperative processing has been set, when one or more predetermined states are detected, the alternative processing generating step generates the alternative processing, whereas when all of the one or more predetermined states are not detected, the alternative processing generating step does not generate the alternative processing.

(7) The cooperative processing execution method according to (6), further including a detecting step in which an operator is detected, in which the one or more predetermined states includes a state in which the operator who has set the cooperative processing is continuing an operation.

(8) The cooperative processing execution method according to (6) or (7), in which the one or more predetermined states include a state in which a communication path used for setting the cooperative processing in the first setting step has been established.

Although embodiments of the present invention have been described and illustrated in detail, the disclosed embodiments are made for purposes of illustration and example only and not limitation. The scope of the present invention should be interpreted by terms of the appended claims, and it is intended that meanings equivalent to the claims and all modifications within the scope are included.

What is claimed is:

1. An image processing apparatus comprising:
   - a first hardware processor that sets cooperative image processing including first image processing and second image processing that cooperate with each other in a server that provides a service that determines the cooperative image processing;
   - a second hardware processor that receives a command to execute the first image processing;
   - a third hardware processor that generates alternative image processing in place of the first image processing in a case where it is detected that the command cannot be received after the cooperative image processing has been set;
   - a fourth hardware processor that executes the alternative image processing,
   - a fifth hardware processor that establishes a first communication path in order for the first hardware processor to communicate with the server;
   - a sixth hardware processor that establishes a second communication path different from the first communication path in order to receive the command; and
   - a seventh hardware processor that monitors a state of the second communication path, wherein the third hardware processor determines that the command cannot be received in a case where the seventh hardware processor detects a state in which communication through the second communication path is not possible.

2. The image processing apparatus according to claim 1, further comprising: an eighth hardware processor that transmits, to the server, an execution result obtained by the fourth hardware processor executing the alternative image processing in response to the reception of the command by the second hardware processor.

3. The image processing apparatus according to claim 2, wherein the eighth hardware processor transmits the execution result according to the command received by the second hardware processor after recovery such that a state in which communication through the second communication path is possible is detected by the seventh hardware processor.

4. The image processing apparatus according to claim 1, further comprising an eighth hardware processor that transmits an execution result obtained by the fourth hardware processor executing the alternative image processing via a communication path different from the second communication path.

5. The image processing apparatus according to claim 1, further comprising a ninth hardware processor that accepts a setting that determines the alternative image processing, wherein
the third hardware processor generates the alternative image processing according to the setting accepted by the ninth hardware processor.

6. The image processing apparatus according to claim 1, wherein in a case where it is detected that the command cannot be received after the cooperative image processing has been set, when one or more predetermined states are detected, the third hardware processor generates the alternative image processing, whereas when all of the one or more predetermined states are not detected, the third hardware processor does not generate the alternative image processing.

7. The image processing apparatus according to claim 6, further comprising a detector that detects an operator, wherein
the one or more predetermined states include a state in which the operator who has set the cooperative image processing is continuing an operation.

8. The image processing apparatus according to claim 6, wherein the one or more predetermined states include a state in which a communication path used for setting the cooperative image processing by the first hardware processor has been established.

9. The image processing apparatus according to claim 1, further comprising a tenth hardware processor that displays an alternative image processing setting screen for setting the alternative image processing side by side with a cooperation setting screen for setting the cooperative image processing.

10. A cooperative image processing execution method in which an image processing apparatus executes:
first setting cooperative image processing including first image processing and second image processing that cooperate with each other in a server that provides a service that determines the cooperative image processing;
receiving a command to execute the first image processing;
generating alternative image processing in place of the first image processing in a case where it is detected that the command cannot be received after the cooperative image processing has been set;
executing the alternative image processing;
establishing a first communication path in order for the image processing apparatus to communicate with the server;
establishing a second communication path different from the first communication path in order to receive the command; and
monitoring a state of the second communication path, wherein
it is determined that the command cannot be received in a case where it is detected that a state in which communication through the second communication path is not possible.

11. A non-transitory recording medium storing a computer readable cooperative image processing execution program causing a computer that controls an image processing apparatus to execute:
first setting cooperative image processing including first image processing and second image processing that cooperate with each other in a server that provides a service that determines the cooperative image processing;
receiving a command to execute the first image processing;
generating alternative image processing in place of the first image processing in a case where it is detected that the command cannot be received after the cooperative image processing has been set;
executing the alternative image processing;
establishing a first communication path in order for the image processing apparatus to communicate with the server;
establishing a second communication path different from the first communication path in order to receive the command; and
monitoring a state of the second communication path, wherein
it is determined that the command cannot be received in a case where it is detected that a state in which communication through the second communication path is not possible.

12. An image processing apparatus comprising:
a first hardware processor that sets cooperative image processing including first image processing and second image processing that cooperate with each other in a server that provides a service that determines the cooperative image processing;
a second hardware processor that receives a command to execute the first image processing;
a third hardware processor that generates alternative image processing in place of the first image processing in a case where it is detected that the command cannot be received after the cooperative image processing has been set; and
a fourth hardware processor that executes the alternative image processing,
wherein in a case where it is detected that the command cannot be received after the cooperative image processing has been set, when one or more predetermined states are detected, the third hardware processor generates the alternative image processing, whereas when all of the one or more predetermined states are not detected, the third hardware processor does not generate the alternative image processing.

13. A cooperative image processing execution method in which an image processing apparatus executes:
- first setting cooperative image processing including first image processing and second image processing that cooperate with each other in a server that provides a service that determines the cooperative image processing;
- receiving a command to execute the first image processing;
- generating alternative image processing in place of the first image processing in a case where it is detected that the command cannot be received after the cooperative image processing has been set; and
- executing the alternative image processing,
- wherein in a case where it is detected that the command cannot be received after the cooperative image processing has been set, when one or more predetermined states are detected, the alternative image processing is generated, whereas when all of the one or more predetermined states are not detected, the alternative image processing is not generated.

14. A non-transitory recording medium storing a computer readable cooperative image processing execution program causing a computer that controls an image processing apparatus to execute:
- first setting cooperative image processing including first image processing and second image processing that cooperate with each other in a server that provides a service that determines the cooperative image processing;
- receiving a command to execute the first image processing;
- generating alternative image processing in place of the first image processing in a case where it is detected that the command cannot be received after the cooperative image processing has been set; and
- executing the alternative image processing,
- wherein in a case where it is detected that the command cannot be received after the cooperative image processing has been set, when one or more predetermined states are detected, the alternative image processing is generated, whereas when all of the one or more predetermined states are not detected, the alternative image processing is not generated.

* * * * *